April 3, 1928.  J. LAUFFER  1,665,136

PRESSURE AND DRAWING CYLINDER FOR SPINNING MACHINES

Filed June 15, 1925

Inventor:
Jean Lauffer.
per: [signature]
Attorney.

Patented Apr. 3, 1928.

1,665,136

UNITED STATES PATENT OFFICE.

JEAN LAUFFER, OF LOGELBACH, FRANCE.

PRESSURE AND DRAWING CYLINDER FOR SPINNING MACHINES.

Application filed June 15, 1925, Serial No. 37,360, and in France June 20, 1924.

The present invention relates to an improvement in pressure cylinders and drawing cylinders of spinning machines, and the main object of the invention is to remove the serious drawbacks resulting from the fact that the spindles of the pressure cylinders of spinning machines require to be lubricated very frequently, i. e. daily, at several points. The labour entailed by this lubrication, if it is to be carried out conscientiously, is very considerable in view of the large number of spindles to be lubricated. For this reason the said lubrication is often neglected and as a result irregularities occur in the twisting of the thread owing to slower rotation of one or the other of the pressure rollers. Even if the considerable labour required daily to carry out the aforesaid lubrication, a careful lubrication has very serious drawbacks; indeed, as it is practically impossible to provide each of the spindles exactly with the required and sufficient quantity of lubricant, it occurs almost continually that the overflowing lubricant soils the lining of the pressure cylinders and therefore indirectly the thread, or even directly the latter.

Similar drawbacks are met in drawing cylinders. The overflowing lubricant covers the grooved cylinder and soils the thread and the pressure cylinder when the drawing cylinder is removed, which has to be done frequently, while when the cylinder is replaced in position, thread waste or fluff is liable to penetrate into the bearings of the spindle.

According to the present invention, the method of lubrication applied heretofore is replaced by a continuous and automatic lubrication. This principle may be carried out in practice by arranging the pressure or drawing cylinder in such a manner that it will be enabled to rotate on the spindle and by forming within the said cylinder a fluid tight cavity or lubricating chamber capable of containing a relatively considerable quantity of lubricating material. In order to reduce friction, ball or roller bearings are preferably interposed in known manner between the cylinder and the spindle.

The novel arrangement just referred to only affects the lubrication of the pressure and the drawing cylinder, and entails no change either in the operation of the said cylinders or in the adjacent devices.

In order that the invention may be readily understood, selected embodiments of the same are, by way of example only, illustrated by the accompanying drawing, wherein.

Figure 1:
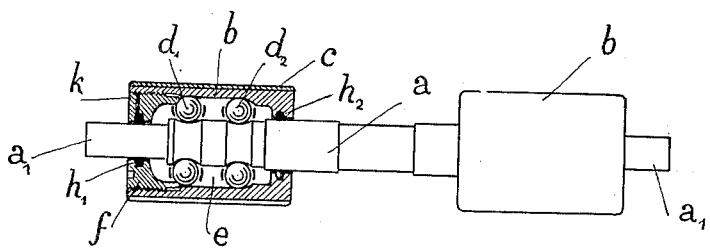
Fig. 1 represents a pressure cylinder according to the invention, one of the two cylinders being shown in longitudinal section.
Figure 2:
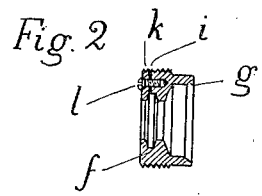
Figures 2 and 3 are respectively a cross section and an end view of a nut provided for the purpose of adjusting the cylinder on the spindle.
Figure 3:
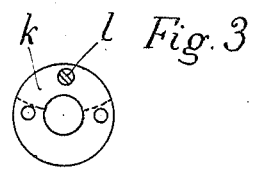

Referring first to Figures 1 to 3, $a$ indicates the stationary spindle, of which the two ends $a^1$ are carried by supports of any suitable known construction. The pressure cylinder $b$ is covered with a felt lining $c$, which is usually covered in turn with leather or parchment paper. The cylinder $b$ is made hollow and is capable of rotating on the spindle $a$; it is mounted on two annular ball bearings $d^1$ and $d^2$, of which the outer ball race is constituted by the inner surface of the cylinder $b$ while the inner ball race is constituted by the spindle $a$. The two ball bearings are made of tempered steel. The chamber $e$ formed within the cylinder $b$ is closed by means of a nut $f$ which has its inner face $g$ formed as an annular abutment for the adjacent ball bearing $d^1$ and serves for adjusting the position of the cylinder in relation to the ball bearings, and consequently to the spindle, in the direction of the longitudinal axis of the latter. The chamber or cavity $e$ is filled with lubricant, and two fluid tight packings $h^1$ and $h^2$ prevent the escape of the said lubricant as well as the penetration of fluff. In view of the fact that the nut $f$ constitutes a means of adjustment, it is provided with means for locking same in adjusted position, the said means consisting of a segment $k$ which, owing to the provision of a slot $i$, may be pressed tight against the threads of the corresponding end of the cylinder $b$ by means of a screw $l$.

Figure 4:
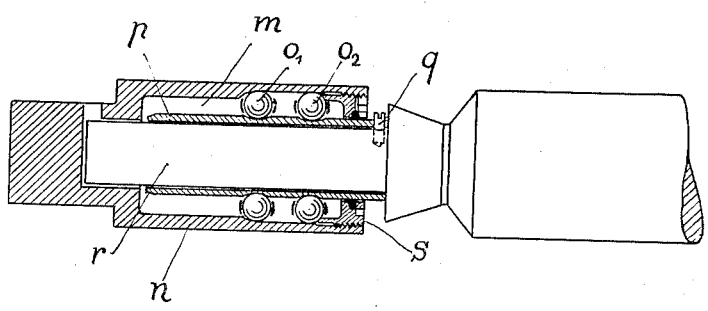
Fig. 4 illustrates in longitudinal section the application of the invention to a drawing cylinder.

Fig. 4 illustrates the application of the invention to a drawing cylinder. The lubricating chamber $m$ is here formed on the one hand by the inner surface of the cylinder $n$ which constitutes the outer ball race of two ball bearings $o^1$ and $o^2$, and on the other hand by a tubular sleeve $p$ surrounding the end portion $r$ of the spindle and forming the inner ball race of the two ball gearings just referred to, the said sleeve $p$ extending practically along the whole of the length of the cavity $m$ and being secured on the said end portion $r$ of the spindle by means of a grub screw $q$, without preventing the cylinder $n$ from being removed when needed. A stopper and adjustment nut $s$, similar to the nut $f$ shown in Fig. 1 and provided with a means for locking same in position, is screwed into the inner end of the cylinder $n$.

Figure 5:
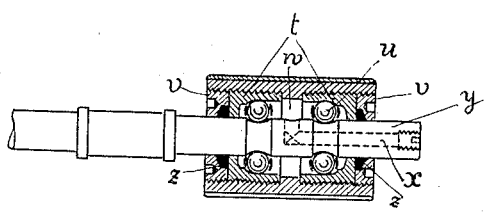
Fig. 5 is a longitudinal section of a modified embodiment of a pressure cylinder according to the invention.

Fig. 5 illustrates a modified embodiment of a pressure roller, wherein the outer ball races of the ball bearings $u$ are constituted by two suitably recessed nuts $t$ screwed into the cylinder and maintained in position by means of lock nuts $v$. The lubricating material is introduced into the cavity or lubricating chamber $w$ by way of a conduit $x$ bored axially and radially in the spindle $y$. Fluid tight packings $z$ prevent the lubricant from escaping from the cavity $w$.

Owing to the provision and the arrangement of the ball bearings, the construction according to the invention offers many advantages, among which may be cited:

1. Considerable economy in the power required to operate the machine;
2. Economy of lubricant;
3. Economy, practically amounting to elimination, of labour for lubrication;
4. Economy due to the fact that the felt, leather or parchment paper lining is no more soiled and damaged by the overflowing lubricant; and
5. Uniform lubrication removing all the above mentioned drawbacks due to irregular lubrication.

I claim:

In a spinning machine, the combination of: a stationary spindle; a rotatable drawing cylinder mounted coaxially on the end-portion of said spindle and having a cavity for lubricating material formed therein; a tubular sleeve secured on the said end-portion of the spindle and extending substantially along the whole length of the cavity of the hollow cylinder; a pair of ball-bearings interposed annularly between the said tubular sleeve and the inner surface of such hollow cylinder; a nut screwed into one end of the said cylinder for adjusting the position of the latter on the end-portion of the spindle in a longitudinal direction, the said nut having its inner face adapted to form an annular abutment for the adjacent ball-bearing; and means for locking the said nut in adjusted position.

In testimony whereof I signed hereunto my name.

JEAN LAUFFER.